United States Patent [19]

Li

[11] 4,428,776

[45] Jan. 31, 1984

[54] CELLULOSIC SEMIPERMEABLE MEMBRANES CONTAINING SILICON COMPOUNDS

[75] Inventor: George S. Li, Macedonia, Ohio

[73] Assignee: The Standard Oil Company, Cleveland, Ohio

[21] Appl. No.: 391,216

[22] Filed: Jun. 23, 1982

[51] Int. Cl.$^3$ .................. C08J 9/24; C08G 77/56; C08L 1/12

[52] U.S. Cl. .................. 106/122; 106/197 R; 106/198; 106/169; 210/500.2; 264/41; 524/41; 521/84.1; 521/64; 521/109.1; 521/154

[58] Field of Search ............ 106/197, 198, 169, 122, 106/196; 524/41; 210/500.2; 536/76; 264/41; 521/64, 154, 84, 109

[56] References Cited

U.S. PATENT DOCUMENTS

| | | | |
|---|---|---|---|
| Re. 30,351 | 7/1980 | Hoehn et al. | 55/16 |
| 3,440,264 | 4/1969 | McVannel | 260/448.2 |
| 3,657,113 | 4/1972 | Stancell et al. | 210/23 |
| 3,754,375 | 8/1973 | Bouchilloux et al. | 55/16 |
| 3,781,378 | 12/1973 | Kantor et al. | 260/824 R |
| 4,106,948 | 8/1978 | Cooper et al. | 106/197 R |
| 4,171,987 | 10/1979 | Horiguchi et al. | 106/196 |
| 4,180,552 | 12/1979 | Graham et al. | 423/359 |
| 4,214,020 | 7/1980 | Ward et al. | 427/296 |
| 4,230,463 | 10/1980 | Henis et al. | 55/16 |
| 4,305,823 | 12/1981 | Batzer et al. | 210/500.2 |
| 4,305,824 | 12/1981 | Uemura et al. | 210/500.2 |
| 4,374,933 | 2/1983 | Scholze et al. | 210/500.2 |

OTHER PUBLICATIONS

Chem. Abst. 74:23459y, VEB Filmfabrik Wolfen, 1974.

*Primary Examiner*—Theodore Morris
*Attorney, Agent, or Firm*—Gary R. Plotecher; Larry W. Evans

[57] ABSTRACT

Semipermeable membranes prepared from at least one cellulosic polymer, such as cellulose triacetate, and containing at least one silicon compound, such as tetraethoxy silane, are useful for the separation of various gaseous mixtures into their constituent parts, such as separating natural gas into enriched fractions of carbon dioxide and methane.

10 Claims, No Drawings

CELLULOSIC SEMIPERMEABLE MEMBRANES CONTAINING SILICON COMPOUNDS

BACKGROUND OF THE INVENTION

1. Field of the Invention

This invention relates to semipermeable membranes and their use for gas separation. In one aspect, the invention relates to semipermeable membranes prepared from one or more cellulosic polymers and at least one silicon compound while in another aspect, the invention relates to the use of these membranes to separate a gaseous mixture into various fractions.

2. Description of the Prior Art

Semipermeable membranes prepared from cellulosic polymers and the use of such membranes for ultrafiltration and desalination has long been known. Over the last several decades and particularly over the last decade, these membranes have also been studied for use in separating gaseous mixtures into various fractions. For example, see Henis and Tripodi, U.S. Pat. No. 4,230,463.

Unmodified cellulose is a nonthermoplastic and an essentially insoluble material in common organic solvents. However, ether and ester derivatives of cellulose, such as ethyl cellulose and cellulose triacetate, are thermoplastic and soluble in a number of different common organic solvents and are thus not only good film and fiber formers but are also commercially important commodities.

Semipermeable membranes manufactured from modified and unmodified cellulosic polymers show, as a group, some interesting properties. For example, cellulose triacetate and cellulose diacetate have a relatively high permeability and selectivity for separating oxygen from air and carbon dioxide from natural gas. However, although these properties are relatively high compared to membranes prepared from other polymers, there still exists opportunity for further improvement.

SUMMARY OF THE INVENTION

According to this invention, a semipermeable membrane is prepared from at least one cellulosic polymer and at least one silicon compound of the formulae

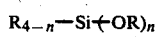  (I)

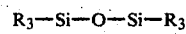  (II)

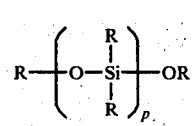  (III)

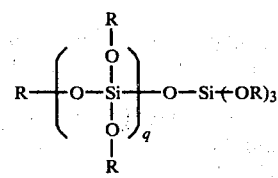  (IV)

where
each R is independently a hydrogen radical, a halide radical, or an aliphatic, cycloaliphatic or aromatic radical or an inertly-substituted derivative of any one of them; with the provisoes that in formula I when n is 0, at least one R is a radical other than hydrogen and where R is directly bonded to oxygen, R is not a halide radical;
n is an integer of 0-4;
p is an integer of at least 1; and
q is an integer of 1-3.

These membranes are useful for separating a gaseous mixture containing at least one of carbon dioxide, oxygen and hydrogen sulfide into two fractions, one fraction being enriched with at least one of these gases and the other fraction being depleted in same. Typical applications for these membranes include the separation of oxygen from air, carbon dioxide from natural gas and hydrogen sulfide from gaseous refinery effluent streams.

DETAILED DESCRIPION OF THE INVENTION

The cellulosic polymers here used to manufacture the semipermeable membrane include both cellulose itself, a natural carbohydrate high polymer (polysaccharide) consisting of anhydroglucose units joined by an oxygen linkage to form long, molecular chains that are essentially linear, and the many chemical modifications of cellulose. These latter include esters, e.g. di- and triacetate; ethers, e.g. methyl and ethyl cellulose; nitrated products, e.g. nitrocellulose; and the like. The size of these polymers, measured by the number of anhydroglucose units in a given chain, can vary widely but generally have at least about 1,000 (preferably at least about 2,500) units per chain. The ester and ether derivatives of cellulose are among the prefered polymers for forming the semipermeable membranes of this invention and methyl and ethyl cellulose and cellulose di- and triacetate are preferred ether and ester derivatives respectively. These latter materials are commercially available and well known in the art.

The silicon compounds used to prepare the semipermeable membranes of this invention are of the formulae I, II, III and IV, where R, n, p and q are as previously defined. The subscript p in formula III can range from a relatively small number, such as 1-20, to a relatively large number, such as 2000 or more. The silicon compounds of formula I are known generally as silanes while the silicon compounds of formulae II, III and IV are known generally as siloxanes. As noted by the proviso to formula I, silane ($SiH_4$) is excluded from the silicon compounds that can be used in the practice of this invention. Similarly, the proviso that prevents those R's directly bonded to oxygen, as in formulae I, III and IV, from being a halide radical thus excludes silicon compounds containing perhalo radicals (e.g. —OCl, —OBr, etc.) from use in this invention. Although each R can be any one of a number of different radicals, typically each R is a hydrocarbon radical of 1 to 8 carbons and preferably an alkyl radical of 1 to 4 carbon atoms. If R is a cycloaliphatic or aromatic radical, then it is preferably $C_5$-$C_7$ cycloalkyl or a phenyl radical, respectively. As here used, the term "inertly-substituted" means that each R radical can contain one or more substituents, e.g. halide, hydroxyl, alkyl, etc., that do not substantially reduce the effectiveness of the membrane for its intended purpose. Also, as here used the term "independently" means that each R radical can be the same or different in any given compound, e.g. in formula II one R can be hydrogen while another be methyl while yet another be ethyl. Typically, R in these compounds is either a hydrogen, methyl or ethyl radical.

Representative silanes and siloxanes that can be used in the practice of this invention include such compounds as dialkyldialkoxy silanes, e.g. dimethyldiethoxy and diethyldiethoxy silane; tetraalkoxy silanes, e.g. tetramethoxy and tetraethoxy silane; aromatic-substituted silanes, e.g. phenyldiethylethoxy silane; cycloalkyl-substituted silanes, e.g. cyclohexyltrimethyl silane; disiloxanes, e.g. hexamethyl disiloxane; trisiloxanes, e.g. octamethyl trisiloxane; polysiloxanes, e.g. silicone fluid, halo-substituted silanes, e.g. dichlorodimethyl silane; and the like. Those silanes and siloxanes that can be hydrolyzed to their hydroxy equivalents, e.g. tetraethoxy silane to tetrahydroxy silane, the chlorosilanes ($Cl_x$—Si—$R_{4-x}$ where x is 1–4) to the hydroxysilanes and the chloro-terminated polysiloxanes to hydroxy-terminated polysiloxanes, are preferred generally over the non- or difficult-to-hydrolyze silanes and siloxanes.

The semipermeable membranes here used can be manufactured by any conventional method. In one embodiment, the cellulosic polymers are dissolved in a suitable solvent to form about 2 to about 20, preferably 5 to about 10, weight percent solution. Generally any polar solvent can be employed with dimethylformamide, dimethylsulfoxide, dimethylacetamide, acetone and methyl ethyl ketone being exemplary. Various nonpolar solvents can also be used such as chloroform, methylene chloride, the various chlorobenzenes and perchloroethylene. A 5–40, preferably 10–30, weight percent solution of the silane or siloxane additive is prepared, generally in the same solvent used to prepare the polymer solution, and then the two solutions are mixed to form a uniform mixture. (In another embodiment, the silane and/or siloxane additive is admixed neat with the polymer solution to form a uniform mixture.) This mixing can be done at any convenient temperature but is generally done at room temperature. The resulting mixture is then poured over a clean glass plate and spread evenly to a uniform thickness with the aid of some instrument, typically a doctor's blade. The membrane is then air dried, removed from the glass plate and further dried in air under ambient conditions for a suitable period of time, generally in excess of 24 hours. In other embodiments, these membranes can be manufactured by the various laboratory and commercial techniques known in the art. These membranes can also be manufactured into structures other than films, such as hollow fibers. Moreover, these membranes can be employed in various composites, such as a coating on an underlying substrate, as a layer in a laminate, etc.

The amount of silane or siloxane added to the polymer can vary widely but is typically between about 5 and about 50 weight percent, based upon the combined weight of the additive and polymer and preferably, between about 10 and about 30 weight percent.

The membranes can be fabricated at any desirable thickness although membranes having a thickness less than about 25 mils (one mil equals 25 micrometers), preferably less than about 10 mils, tend to be the most useful. Because the flux of a membrane tends to increase with a decrease in the thickness of the membrane, generally the thinner the membrane, the more desirable the membrane. Of course, the ultimate thickness of the membrane is determined by a whole host of factors of which flux is just one and thus the preferred membrane thickness will vary from application to application.

Although the precise nature of the relationship between the cellulosic polymer and the silane and/or siloxane additive is not known, the additives are physically and/or chemically bound between the polymer chains in such a manner that they are not easily leached from the finished membrane. However, the chemical composition of the additives can be changed after their incorporation into the membrane as for example, by exposing the membrane to a hydrolysis agent. Under such circumstances, if the additive has hydrolyzable functionalities, such as the ethoxy groups of dimethyldiethoxy silane, the additive will be converted (depending upon the degree of hydrolysis) to a hydrolyzed derivative, such as dimethyldihydroxy silane. In some applications of this invention, such modified membranes are highly desirable due to increased permeability.

The semipermeable membranes of this invention find particular utility for the separation of gaseous carbon dioxide and methane (natural gas) mixtures into their constitutent parts, e.g. enriched fractions of carbon dioxide and methane. However, these membranes also have utilities for separating other gaseous mixtures, such as those containing oxygen, nitrogen, helium and the like. Representative of these other kinds of mixtures are air, chemical process off-gas effluent streams, gaseous refinery effluent streams, and the like.

These membranes are used in the same manner as known membranes, i.e. the gaseous mixture to be separated is contacted with one side of the membrane in such a manner that one or more constituent parts of the mixture selectively passes through the membrane while the remaining constituent parts are rejected by the membrane. The temperature and pressure at which the separation process is conducted will vary with the application and are generally defined by such factors as the nature of the gaseous mixture to be separated, the composition of the membrane, the thickness of the membrane, etc.

The following examples are illustrative of certain specific embodiments of this invention and unless indicated to the contrary, all parts and percentages are by weight.

SPECIFIC EMBODIMENTS

Polymers and Additives:

The polymers here used were commercially acquired. The ethyl cellulose polymer had a viscosity of 100 centipoise as a 5 weight percent solution in a 80/20 weight ratio solvent of toluene and ethanol and was obtained from Aldrich Chemical Company (1981–82 catalog, #20,066-2). The cellulose triacetate polymer was also obtained from Aldrich Chemical Company (1981–82 catalog, #18,100-5).

The silane and siloxane additives here used were also commercially acquired. The hexamethyl disiloxane $(CH_3)_3$—Si—O—Si$(CH_3)_3$; tetraethoxy silane, Si$(OC_2H_5)_4$; and dimethyldiethoxy silane, $(CH_2)_2$Si$(OC_2H_5)_2$ were obtained from Petrarch Systems. The dichlorodimethyl silane, $(Cl)_2$Si$(CH_3)$, was acquired from Aldrich Chemical Company and the silicone fluid (hydroxy form), L9000/1000, was acquired from Union Carbide Corp.

Membrane Preparation:

The membranes were prepared by mixing a dilute (about 5–10 weight percent) solution of polymer in a suitable solvent, typically chloroform, with the additive (neat). After the two were thoroughly mixed, they were poured over a clean glass plate and spread evenly to a uniform thickness with the aid of a doctor's blade, air dried, removed from the glass plate and further dried in air at ambient conditions for at least 24 hours. Where no additive was used, the dilute polymer solution was simply poured upon the glass plate and dried in the same manner.

Apparatus and Procedure:

A modified Gilbert Cell was used to test the permeation of the films. The test side was exposed to either a carbon dioxide/methane/nitrogen mixture in a mole ratio of 3:32:65 or an oxygen/nitrogen mixture in a mole ratio of 21.3:78.7. The permeant was picked up by a carrier gas, helium, and injected intermittently through a sample value into a GC column for analysis. The experiments were conducted at 23° C., the partial pressure of the test gas on the feed side was 29.8 psi and the partial pressure of the product gas on the permeant was about 0 and purged with 29.8 psi helium at a flowrate much in excess of the permeation rate. The area of the test membrane was about 7.1 square inches. The film thickness was between 1 and 2 mils.

The carbon dioxide and oxygen permeability and carbon dioxide/methane and oxygen/nitrogen selectivity figures are reported in the following Table.

TABLE

SEPARATION CHARACTERISTICS OF SEMIPERMEABLE MEMBRANES PREPARED FROM CELLULOSIC POLYMERS AND VARIOUS SILICON COMPOUNDS

| Ex. | Polymer | Silicon Compound | $CO_2$* | $CO_2/CH_4$** | $O_2$* | $O_2/N_2$** |
|---|---|---|---|---|---|---|
| A | Ethyl Cellulose | None | 116 | 10.6 | 13.1 | 3.34 |
| 1 | Ethyl Cellulose | $(CH_3)_3Si-O-Si-(CH_3)_3$ (30 wt %) | 178 | 8.5 | 27.2 | 2.91 |
| 2 | Ethyl Cellulose | $Si-(OC_2H_5)_4$ (30 wt %) | 225 | 7.7 | 31 | 2.84 |
| 3 | Ethyl Cellulose | $Si-(OC_2H_5)_4$ (20 wt %) | 217 | 6.6 | 30.3 | 3.2 |
| 4 | Ethyl Cellulose | $(CH_3)_2Si-(OC_2H_5)_2$ (25 wt %) | 159 | 7.64 | 23.4 | 3.4 |
| B | Cellulose Triacetate | None | 13.2 | 36 | 1.6 | 4.3 |
| 5 | Cellulose Triacetate | Silicone Fluid$^A$ (20 wt %) | 30.5 | 32 | 2.84 | 4.24 |
| 6 | Cellulose Triacetate | $(Cl)_2Si-(CH_3)_2{}^B$ (33 wt %) | 45 | 25 | 4.48 | 3.7 |

*Permeability in barrers.
**Selectivity = Ratio of Permeabilities.
$^A$A mixture of compounds (the value of p varies from one polymer chain to another) of formula III where each R is a methyl radical.
$^B$Hydrolyzed to form a mixture of $HO-Si(CH_3)_2-OH$ and oligmers of $HO-(Si(CH_3)_2O)_pH$ where p is 2-10.

The above data clearly demonstrate the general syperiority of membranes formed from blends of a cellulosic polymer and a silane or siloxane additive. The membranes formed from these blends demonstrate not only superior permeability and selectivity for carbon dioxide/methane mixtures but also for oxygen/nitrogen mixtures. In each case, the increase over the corresponding control is marked.

The permeation factor, expressed in barrers, is expressed as the quotient of a product of product gas volume (cm$^3$, STP) times membrane thickness (cm) divided by the product of membrane surface area (cm$^2$) times the pressure differential across the membrane (cm Hg) times the period of separation (sec). The factor $10^{-10}$ is simply used for convenience. The separation factor was calculated by taking the ratio of the various permeation factors, i.e.

$$\frac{CO_2 \text{ Permeation Factor}}{CH_4 \text{ Permeation Factor}}$$

A similar formula can be written for the oxygen/nitrogen separation factor.

While this invention has been described in considerable detail by the preceding examples, this detail was provided for the purpose of illustration only and is not to be construed as a limitation upon the invention as described in the following claims.

What is claimed is:

1. A semipermeable membrane useful for separating a gaseous mixture of carbon dioxide and methane into enriched fractions of each, the membrane prepared from at least one cellulosic polymer and at least one silicon compound of the formulae $$R_{4-n}-Si(-OR)_n \quad (I)$$

$$R_3-Si-O-Si-R_3 \quad (II)$$

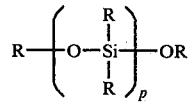

(III)

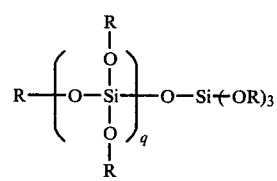

(IV)

where
each R is independently a hydrogen radical, a halide radical, or an aliphatic, cycloaliphatic or aromatic radical or an inertly-substituted derivative of any one of them, with the provisoes that where R is directly bonded to oxygen, R is not a halide radical and in formula I when n is zero, at least one R is a radical other than hydrogen;
n is an integer of 0-4;
p is an integer of at least 1;
q is an integer of 1-3; and
the silicon compound comprises between about 5 and about 50 weight percent of the membrane, based on the combined weight of the silicon compound and the cellulosic polymer.

2. The membrane of claim 1 where the cellulosic polymer is an ester or ether derivative of cellulose.

3. The membrane of claim 2 where the cellulosic polymer is at least one of methyl cellulose, ethyl cellulose, cellulose diacetate and cellulose triacetate.

4. The membrane of claim 3 where the silicon compound is at least one of formulae I, II and III.

5. The membrane of claim 4 where each R is independently a hydrogen radical, a halide radical, a $C_1$–$C_8$ alkyl, $C_5$–$C_7$ cycloalkyl or phenyl radical or an inertly-substituted derivative of any one of them.

6. A membrane of claim 5 where the silicon compound is at least one of a disiloxane, a tetraalkoxy silane, a dialkyldialkoxy silane, a polysiloxane and a trisiloxane.

7. The membrane of claim 6 where the silicon compound comprises between about 10 and about 30 weight percent of the membrane, based upon the combined weight of the silicon compound and the cellulosic polymer.

8. The membrane of claim 7 where the membrane has a thickness less than about 25 mils.

9. The membrane of claim 7 where the membrane is a hollow fiber.

10. The membrane of claim 7 where the membrane is a coating on an underlying substrate.

* * * * *